(12) United States Patent
Usa et al.

(10) Patent No.: US 6,967,815 B2
(45) Date of Patent: Nov. 22, 2005

(54) METHOD OF DEPICTING A PATTERN WITH ELECTRON BEAM AND DISC-LIKE SUBSTRATE AND MAGNETIC RECORDING MEDIUM

(75) Inventors: Toshihiro Usa, Odawara (JP); Kazunori Komatsu, Odawara (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 184 days.

(21) Appl. No.: 10/682,987

(22) Filed: Oct. 14, 2003

(65) Prior Publication Data
US 2004/0080871 A1   Apr. 29, 2004

(30) Foreign Application Priority Data
Oct. 15, 2002 (JP) .............................. 2002-300440
Nov. 28, 2002 (JP) .............................. 2002-345615

(51) Int. Cl.[7] .............................................. G11B 5/74
(52) U.S. Cl. ..................................................... 360/131
(58) Field of Search .................................. 360/131, 135

(56) References Cited

U.S. PATENT DOCUMENTS

| | | | |
|---|---|---|---|
| 3,983,328 A | * | 9/1976 | Newell .................. 386/89 |
| 6,347,016 B1 | | 2/2002 | Ishida et al. |
| 2001/0028964 A1 | | 10/2001 | Nagao et al. |

FOREIGN PATENT DOCUMENTS

| | | |
|---|---|---|
| JP | 63-183623 A | 7/1988 |
| JP | 2001-110050 A | 4/2001 |

* cited by examiner

*Primary Examiner*—George Letscher
(74) *Attorney, Agent, or Firm*—Sughrue Mion, PLLC

(57) ABSTRACT

A desired pattern of elements, including an element having a slant side intersecting a recording track, is depicted on a resist layer on a disc-like substrate. The element is depicted by causing an electron beam whose beam diameter is smaller than the minimum width of the element to scan the resist layer so that the trajectory of the beam center of the electron beam on the resist layer draws a periodic waveform traveling along an axis parallel to the recording track. The periodic waveform is drawn from a starting point which is on a valley or a peak of the waveform. Angles $\theta 3$, $\theta 1$ and $\theta 2$ satisfy the relation $\theta 1 < \theta 3 < \theta 2$.

Figure 1A:
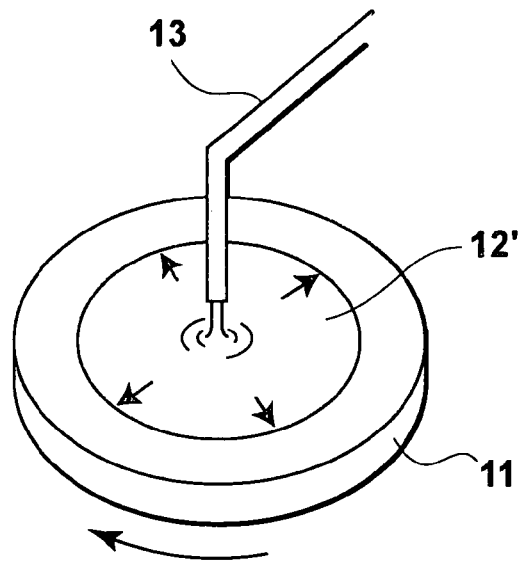

22 Claims, 12 Drawing Sheets r_out r_m r_in

METHOD OF DEPICTING A PATTERN WITH ELECTRON BEAM AND DISC-LIKE SUBSTRATE AND MAGNETIC RECORDING MEDIUM

BACKGROUND OF THE INVENTION

1. Field of the Invention

This invention relates to a method of depicting a desired pattern of elements with an electron beam on a resist layer formed on a disc-like substrate, a disc-like substrate for a high-density recording such as a master information carrier for magnetic transfer, an optical disc stamper and a patterned medium for high-density magnetic recording and a recording medium.

2. Description of the Related Art

There has been known magnetic transfer where the surface of a master information carrier having thereon a fine irregularity pattern of magnetic material representing information to be transferred is brought into close contact with a surface of a slave medium (a magnetic recording medium) having a magnetic layer to which the information is transferred and a transfer magnetic field is applied to the slave medium and the master information carrier in this state, thereby recording on the slave medium a magnetization pattern representing the information (e.g., a servo signal) on the master information carrier. See, for instance, Japanese Unexamined Patent Publication No. 63(1988)-183623 and U.S. Pat. No. 6,347,016.

The master information carrier generally comprises a substrate and an irregularity pattern (a pattern of protruding portions and recessed portions) of magnetic material formed on the substrate.

It has been expected that the master information carrier for magnetic transfer can be produced by the use of a method of producing an optical disc stamper, for producing optical discs, on the basis of a matrix carrying thereon an irregularity pattern of resist representing information to be transferred. (See, for instance, in U.S. Patent Laid-Open No. 20010028964.)

Further, it is conceivable that the irregularity pattern of resist corresponding to the irregularity pattern on the substrate of the master information carrier for magnetic transfer can be depicted on the resist layer formed on a disc-like matrix by exposing the resist layer to a laser beam modulated according to information to be transferred while rotating the matrix in the same manner as the production of the optical disc matrix.

However, as the track width is narrowed (e.g., to not larger than 0.3 μm), for instance, to meet a demand for a higher recording density, the drawing diameter of a laser beam (the diameter at which a laser beam draws an image on the resist layer) comes not to be able to be thinned to draw a pattern of lands (protruding portions) and grooves (recessed portions) in such a narrow tracks. As a result, elements of the irregularity pattern of resist come to have arcuate end portions and cannot be rectangular in shape. The element of the irregularity pattern on the master information carrier conforms to the element of the irregularity pattern of resist on the matrix in shape, especially in shape of the upper surface of the element. Accordingly, when the element of the irregularity pattern of resist on the matrix has end portions which are arcuate and not rectangular, the element of the irregularity pattern on the master information carrier also has end portions which are arcuate and not rectangular. Arcuate end portions of the lands of the irregularity pattern on the master information carrier result in incorrect formation of a magnetization pattern on the slave medium.

We, this applicant has proposed, in Japanese Patent Application 2002-202629, a method of depicting a pattern on the resist layer of the matrix by the use of an electron beam which is smaller in beam diameter than the laser beam.

In the method disclosed in Japanese Patent Application 2002-202629, an irregularity pattern is depicted on the resist layer with an electron beam whose diameter is smaller than the minimum width of the elements (such as the upper surfaces of the protruding portions or the openings of the recessed portions) of the irregularity pattern, and the shape of each element is drawn by causing the electron beam to scan the resist layer a plurality of times. For example, in the case where an element of the irregularity pattern is of a rectangle perpendicular to the direction of recording tracks (the circumferential direction), the matrix is slightly rotated each time the electron beam scans the matrix in the direction perpendicular to the direction of recording tracks. The one scanning of the electron beam and the fine rotation of the matrix are alternately repeated a plurality of times, thereby depicting one element.

However, the method involving causing an electron beam to scan in radial directions a plurality of times is disadvantageous in that, when the irregularity pattern includes an element which is a parallelogram having a slant side obliquely intersecting the direction of recording tracks in its shape as well as an element the shape of which is of a rectangle perpendicular to the direction of recording tracks extending vertically to the same (e.g., a phase servo pattern), the slant side is zigzagged and cannot be precisely formed. The slant side of the element which is a parallelogram in shape corresponds to a magnetization transition zone, and the linearity thereof is very important upon reproduction of the signal. Further, it is required to precisely control the inclination of the slant side to the recording tracks.

It is conceivable to meet demands described above by a method in which elements are depicted by causing an electron beam to scan back and forth a plurality of times in a direction of the slant side. However, these inventors have found that even if the electron beam is caused to scan to trace a trajectory inclined by the same angle as the desired inclination of the slant side, a slant side inclined by the desired angle cannot be actually obtained since the area exposed to an electron beam depends upon overlapping of the trajectory of the electron beam, the exposure time and/or the like and overlapping of the trajectory of the electron beam differs according to the part where the electron beam overlaps, near the peak or the valley or at an intermediate portion.

Accordingly, there has been a demand for a method which can easily depict an element having a desired slant side with an electron beam.

Also in the field of optical discs, it will become necessary to depict a pattern with an electron beam upon making a stamper in order to obtain a higher recording density.

It has been proposed to depict a pattern with an electron beam in production of a patterned medium realization of which has been expected as a high density magnetic recording medium which can be small in size and light in weight. See, for instance, Japanese Unexamined Patent Publication No. 2001-110050. However, in Japanese Unexamined Patent Publication No. 2001-110050, though use of an electron beam has been disclosed, how to depict a pattern with an electron beam has not been disclosed in detail.

With an increase in information quantity, there is a demand for a magnetic recording medium which is high in memory capacity, low in cost and preferably requires a short time to read out a necessary part of data (a magnetic recording medium which allows so-called high-speed access). As an example of such a magnetic recording medium, there has been known a high recording density magnetic medium such as a hard disc, a zip (Iomega) and the like. In such a high recording density magnetic medium, the recording area is formed by narrow data tracks. In order to cause a magnetic head to accurately trace such narrow data tracks and reproduce the data at a high S/N ratio, the so-called servo tracking technique has been employed.

In order to perform the servo tracking, it is necessary to write servo information such as servo tracking signals for positioning the data tracks, address signals for the data tracks and reproduction clock signals on the magnetic recording medium as a preformat upon production thereof. At the present, such preformat recording is performed by the use of a specialized servo recording apparatus (a servo track writer). However, the preformat recording by the conventional servo recording apparatus is disadvantageous in that it takes a long time since the servo information must be recorded on the magnetic recording medium one by one by the use of a magnetic head, which deteriorates the productivity.

As a method of recording the preformat accurately and efficiently, there has been proposed, for instance, in Japanese Unexamined Patent Publication No. 63(1988)-183623 and U.S. Pat. No. 6,347,016, a magnetic transfer method in which a pattern which is formed on a master information carrier and represents servo information is copied to a magnetic recording medium (a slave medium) by magnetic transfer.

In the magnetic transfer, the magnetization pattern representing the information (e.g., servo information) carried by a master information carrier is magnetically transferred from the master information carrier to a slave medium by applying a transfer magnetic field to the slave medium and the master information in close contact with each other, and accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

The conventional servo writing by the use of a servo track writer can suppress the azimuth loss since it records the servo signal by the use of the same magnetic head. However, when a signal represented by a magnetization pattern of a magnetic disc on which the magnetization pattern is formed by the magnetic transfer employing the master information carrier is to be reproduced by a magnetic head of a recording and reproducing system, the azimuth loss can become large since recording and reproduction are effected in quite different systems. Increase in the azimuth loss results in deterioration of the quality of the reproduced signal. Especially, when the transferred signal is a servo signal, increase in the azimuth loss results in deterioration of accuracy of the tracking servo.

Production of any one of the master information carrier, the optical disc stamper and the patterned medium involves depicting a desired pattern of elements on a resist layer formed on a disc-like substrate, and forming an irregularity pattern corresponding to the desired pattern of elements.

SUMMARY OF THE INVENTION

In view of the foregoing observations and description, the primary object of the present invention is to provide a method of precisely depicting a desired pattern on a resist layer on a disc-like substrate with an electron beam.

Another object of the present invention is to provide a substrate for producing a high density recording medium such as a master information carrier for magnetic transfer, an optical disc stamper, a patterned medium or the like, carrying thereon a pattern precisely depicted with an electron beam.

Still another object of the present invention is to provide a master information carrier which makes it feasible to obtain a good reproduction signal small in azimuth loss from a slave medium to which information is transferred from the master information carrier by magnetic transfer.

Still another object of the present invention is to provide a magnetic disc to which information is transferred from a master information carrier by magnetic transfer and from which a good reproduction signal small in azimuth loss can be obtained.

In accordance with a first aspect of the present invention, there is provided a method of depicting a desired pattern of elements, including an element having a slant side intersecting a recording track, on a resist layer formed on a disc-like substrate, by selectively exposing the resist layer to an electron beam, wherein the improvement comprises that said element having a slant side intersecting a recording track is depicted by causing an electron beam whose beam diameter is smaller than the minimum width of the element to scan the resist layer so that the trajectory of the beam center of the electron beam on the resist layer draws a periodic waveform traveling along an axis parallel to the recording track, said periodic waveform is drawn from a starting point which is on a valley or a peak of the waveform, and an angle $\theta 3$ between the slant side of the element and said axis, an angle $\theta 1$ which is an angle between a first half period of the trajectory of the electron beam starting from the starting point and said axis and a corresponding angle to the angle $\theta 3$, and an angle $\theta 2$ which is an angle between a second half period of the trajectory of the electron beam contiguous to the first half period and said axis and a corresponding angle to the angle $\theta 3$ satisfy the relation $\theta 1 < \theta 3 < \theta 2$.

Depiction of said element may be carried out, for instance, by oscillating back and forth, in directions intersecting the circumferential direction of the disc-like substrate, an electron beam smaller in its beam diameter than the minimum width of the element while rotating the substrate in one direction.

In accordance with a second aspect of the present invention, there is provided a disc-like substrate for high-density recording produced through the step of depicting a desired pattern of elements, including an element having a slant side intersecting a recording track, on a resist layer formed on a disc-like substrate, by selectively exposing the resist layer to an electron beam, wherein the improvement comprises that said element having a slant side intersecting a recording track is depicted by causing an electron beam whose beam diameter is smaller than the minimum width of the element to scan the resist layer so that the trajectory of the beam center of the electron beam on the resist layer draws a periodic waveform traveling along an axis parallel to the recording track, said periodic waveform is drawn from a starting point which is on a valley or a peak of the waveform, and an angle θ3 between the slant side of the element and said axis, an angle θ1 which is an angle between a first half period of the trajectory of the electron beam starting from the starting point and said axis and a corresponding angle to the angle θ3, and an angle θ2 which is an angle between a second half period of the trajectory of the electron beam contiguous to the first half period and said axis and a corresponding angle to the angle θ3 satisfy the relation

θ1<θ3<θ2.

Depiction of said element may be carried out, for instance, by oscillating back and forth, in directions intersecting the circumferential direction of the disc-like substrate, an electron beam smaller in its beam diameter than the minimum width of the element while rotating the substrate in one direction.

The term "desired pattern" as used here means those formed of concentrically or helically arranged elements of one or more bits. The shape, the size and the arrangement of the elements vary substrate by substrate.

It is possible to depict a concentrically or helically extending pattern of elements (grooves or lands).

The term "the minimum width of the element" as used here means the smallest one of the distances between opposed sides of the element. For example, when the element is substantially a parallelogram (including a rectangle) in shape, then the minimum width of the element is the smaller one of the distances between opposed parallel sides.

The disc-like substrate maybe a substrate for producing, for instance, a master information carrier for magnetic transfer, an optical disc stamper, a patterned medium for high-density magnetic recording, or the like.

The master information carrier carries on its substrate a magnetic layer in a pattern representing information to be transferred to a slave medium (a magnetic recording medium) The disc-like substrate on which a desired pattern is depicted with an electron beam may be the substrate of a master information carrier or a matrix on the basis of which master information carriers are produced. Further, the information to be transferred to the slave medium may be, for instance, a servo signal. The magnetic layer is formed on the disc-like substrate according to the depicted pattern.

The "magnetic layer in a pattern" may be formed either along only the upper surface of lands (protruding portions) of an irregularity pattern formed on the substrate or along an irregularity pattern formed on the substrate. Alternatively, the "magnetic layer in a pattern" may be formed by magnetic material embedded in grooves (recessed portions) of an irregularity pattern formed on the substrate. Further, the "magnetic layer in a pattern" may be a magnetic layer which is formed on a flat substrate and is provided with an irregularity pattern or may comprise a plurality of magnetic layers provided on a flat substrate independently of each other. In the case where a substrate having an irregularity pattern on its surface is formed of a magnetic material, the irregularity pattern itself may be the "magnetic layer in a pattern" and the substrate itself may be a master information carrier. However, also in this case, it is preferred that a magnetic layer be formed on the substrate. As the magnetic layer, those formed of soft or semi-hard magnetic material be preferred.

The magnetic layer in a pattern of a master information carrier is formed according to said desired pattern and the pattern formed by the upper surfaces of the protruding portions (lands) of the irregularity pattern or by the openings of the recessed portions (grooves) of the irregularity pattern corresponds to the desired pattern. The individual upper surfaces of the protruding portions (lands) of the irregularity pattern or the openings of the recessed portions (grooves) of the irregularity pattern correspond to the individual elements of the desired pattern.

The "optical disc stamper" is a substrate carrying on its surface an irregularity pattern representing information to be transferred to optical discs. The disc-like substrate on which a desired pattern is depicted with an electron beam may be an optical stamper itself or a matrix on the basis of which optical stampers are produced.

The irregularity pattern on the disc-like substrate includes so-called lands, pits, and grooves, and is formed according to said desired pattern. Here the pattern formed by the upper surfaces (openings) of the pits and the grooves corresponds to the desired pattern. The pit is an element which is a parallelogram in shape.

The "patterned medium" is a high-density magnetic recording medium and comprises finely divided magnetic particles (each forming a single magnetic domain) regularly arranged physically isolated from each other so that one bit is recorded on one finely divided magnetic particle as disclosed in Japanese Unexamined Patent Publication No. 2001-110050. The disc-like substrate on which a desired pattern is depicted with an electron beam may be the substrate of a patterned medium or a matrix on the basis of which patterned media are produced. In the patterned medium, the single magnetic domain finely divided particles are formed according to the desired pattern, and the upper surfaces of the single magnetic domain finely divided particles correspond to the individual elements of the desired pattern.

In accordance with the method of the first aspect of the present invention, an element having a slant side inclined by a desired angle θ3 with respect to the recording track can be accurately depicted since when the relation θ1<Θ3<θ2 is satisfied, the scanning waveform of the electron beam can be set taking into account expansion of the exposed area due to overlapping of the electron beam near the peak or the valley Further, there has been a problem that when an element having a slant side obliquely intersecting the direction of recording tracks in shape is depicted, the slant side is zigzagged if the element is depicted by causing the electron beam to scan the resist layer a plurality of times in parallel to the direction of the recording tracks or radial directions perpendicular to the direction of the recording tracks as in the prior art described above. Whereas, in accordance with the method of the first aspect of the present invention, the slant side can be substantially linear and the pattern can be excellently depicted.

When said element is depicted by oscillating an electron beam back and forth in directions intersecting the circumferential direction of the disc-like substrate while rotating the substrate in one direction, the depicting speed can be greatly increased as compared with when the disc-like substrate is intermittently rotated.

The disc-like substrate for high density recording produced by the steps involving the method of depicting a desired pattern in accordance with the first aspect of the present invention can carry a desired pattern which has been precisely depicted.

When a master information carrier produced by the steps involving the method of depicting a desired pattern in accordance with the first aspect of the present invention is employed to magnetic transfer, the slave medium can output a high quality signal.

When an optical disc stamper produced by the steps involving the method of depicting a desired pattern in accordance with the first aspect of the present invention is employed to produce an optical disc, optical discs such as CDs or DVDs which are improved in production properties can be obtained.

The patterned medium produced by the steps involving the method of depicting a desired pattern in accordance with the first aspect of the present invention has a precisely arranged high-density pattern.

In accordance with a third aspect of the present invention, there is provided a master information carrier which is for transferring information to a magnetic disc medium to be used in a magnetic disc system having a reproduction head fixed to a rotary arm and is provided on its surface with a pattern of concentrically or helically arranged magnetic elements representing the information to be transferred, wherein each magnetic element forming the pattern has an upper surface which is a parallelogram in shape having two pairs of opposed parallel sides, one pair of opposed parallel sides thereof extending along a circumferential direction of the concentric circles or the helicoids along which the magnetic elements are arranged, and the other pair of opposed parallel sides extending in a direction intersecting the circumferential direction, and said the other pair of opposed parallel sides extend in the direction of width of the head gap of the reproduction head in a position on the magnetic disc medium corresponding to the magnetic element.

The "magnetic disc system having a reproduction head fixed to a rotary arm" means a system in which the reproduction head arcuately moves across the circumferences of the magnetic disc medium. For example, the "magnetic disc system having a reproduction head fixed to,a rotary arm" may comprise a rotary actuator which drives the rotary arm.

The expression "the master information carrier is provided on its surface With a pattern of magnetic elements" means that the master information carrier is provided with a magnetic elements formed in a pattern on a surface of the master information carrier which is opposed to a magnetic disc medium (a slave medium) upon magnetic transfer, and the pattern may be formed by magnetic materials formed at least on the surface of the protruding portions of the irregularity pattern, those embedded only in the recessed portions of the irregularity pattern, a magnetic layer having on its surface protruding portions and recessed portions or by magnetic materials disposed to form a pattern. The master information carrier maybe either brought into contact with the magnetic disc medium or brought close to the magnetic disc medium.

Accordingly, "each magnetic element forming the pattern" means an individual magnetic material formed on the surface of the master information carrier brought into contact with the magnetic disc medium or brought close to the magnetic disc medium. For example, "each magnetic element forming the pattern" is each of magnetic materials formed on the surface of the protruding portions of the irregularity pattern, those embedded in the recessed portions of the irregularity pattern, protruding portions of the magnetic layer having on its surface protruding portions and recessed portions or of magnetic materials disposed to form a pattern.

"The direction of width of the head gap of the reproduction head" is a direction of width of a recording track governed by the reproduction head, and differs by the distance of the element from the center of the disc-like substrate in the case of a reproduction head which is fixed to a rotary arm and arcuately moved across the circumferences of the magnetic disc medium.

Accordingly, the master information carrier in accordance with a third aspect of the present invention is characterized in that inclination of said the other pair of parallel sides of the upper surface of the magnetic to the circumferential direction differs by the distance of the element from the center of the disc-like substrate.

The information to be transferred may represent a servo signal.

In accordance with a fourth aspect of the present invention, there is provided a magnetic disc medium which is used in a magnetic disc system having a reproduction head fixed to a rotary arm and is provided with concentric recording tracks or a helical recording track, wherein a magnetization pattern comprising magnetic domains arranged along the recording track is formed on the magnetic disc medium transferred by magnetic transfer from the master information carrier in accordance with the third aspect of the present invention, and the magnetization transition zone between the magnetic domains arranged along the recording track extends in the direction of width of the head gap of the reproduction head in the track position.

In the magnetic disc medium in accordance with the fourth aspect of the present invention, the magnetization pattern suitably represents a servo signal.

In the magnetic disc medium to which information is transferred by magnetic transfer from the master information carrier in accordance with the third embodiment of the present invention, the magnetization transition of the magnetization pattern extends in the direction of width of the head gap of the reproduction head, whereby the azimuth loss can be suppressed and a good reproduction signal can be obtained.

Especially when the information to be transferred is a servo signal, accuracy in tracking can be improved.

DESCRIPTION OF THE PREFERRED EMBODIMENT

Figure 1B:
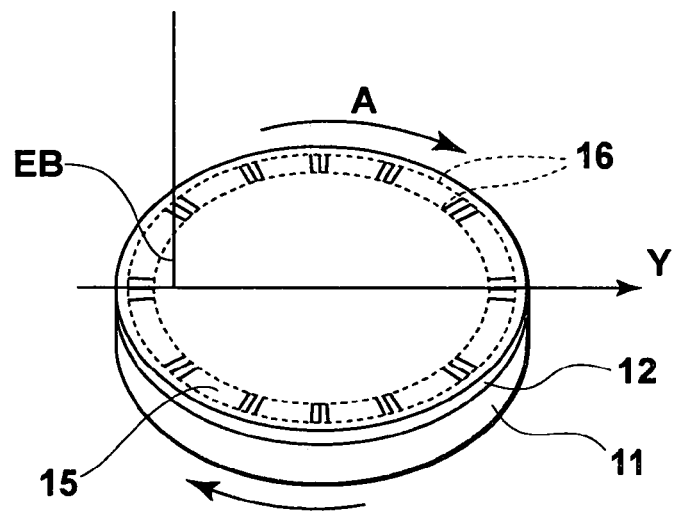
Figure 1C:
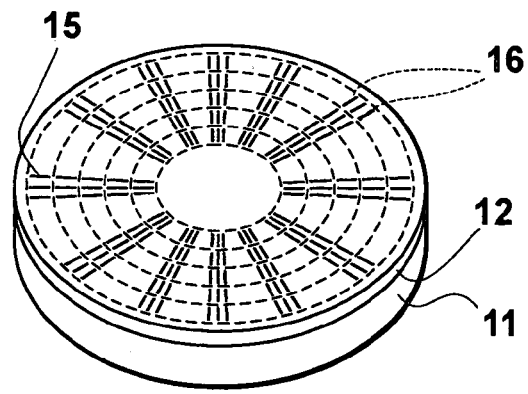
Figure 2:
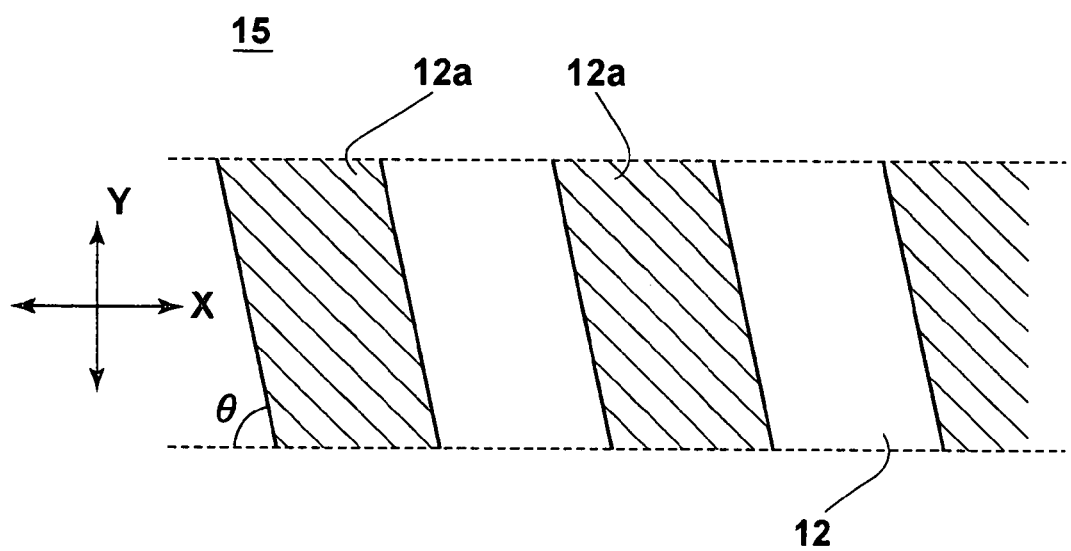
Figure 3A:
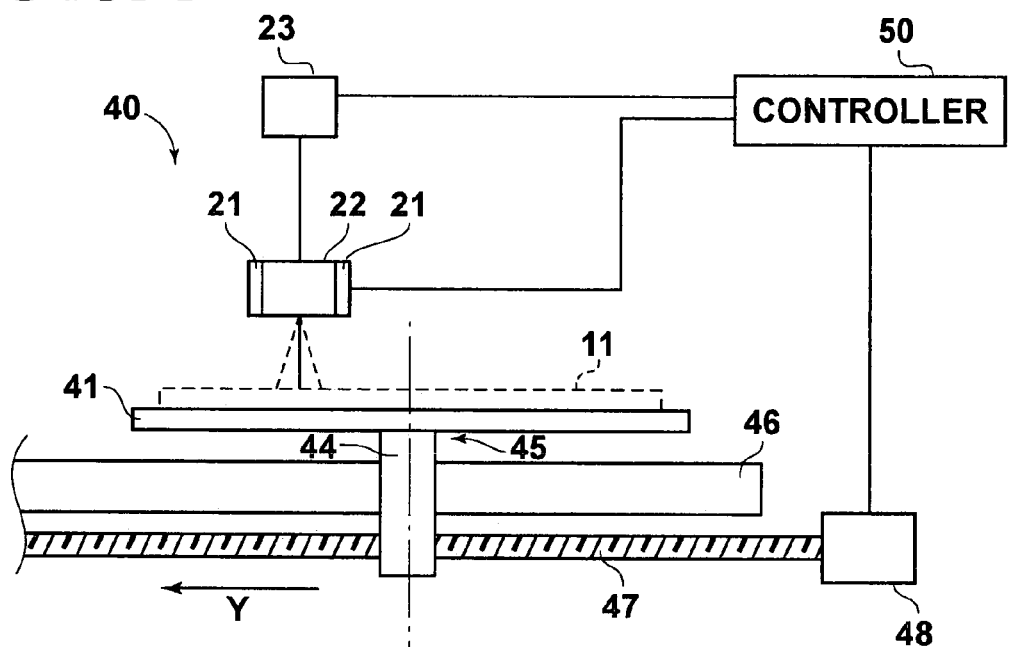
Figure 3B:
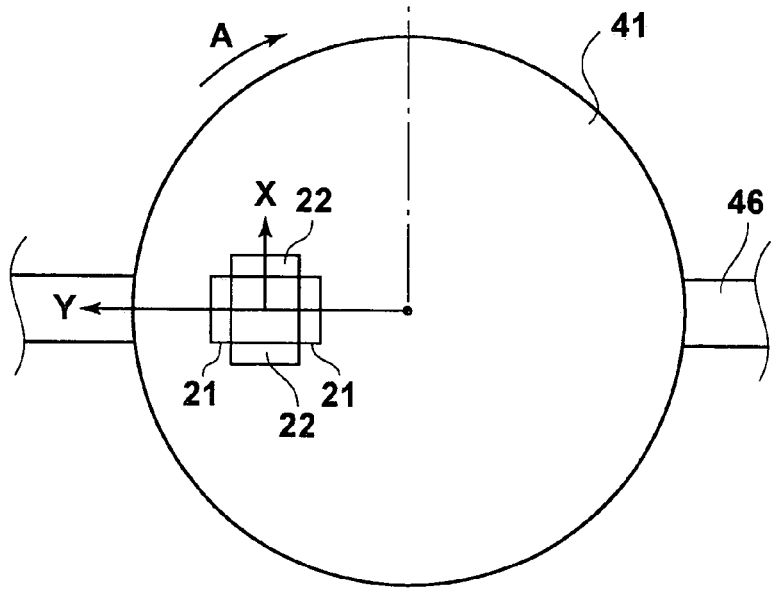
Figure 4:
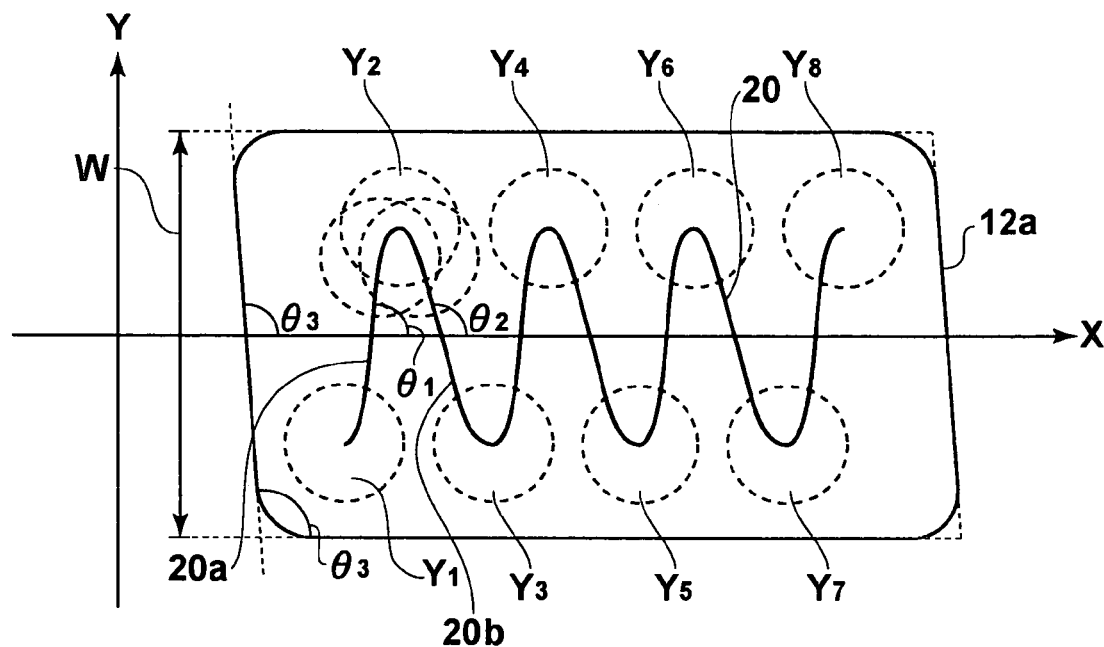
Figure 5:
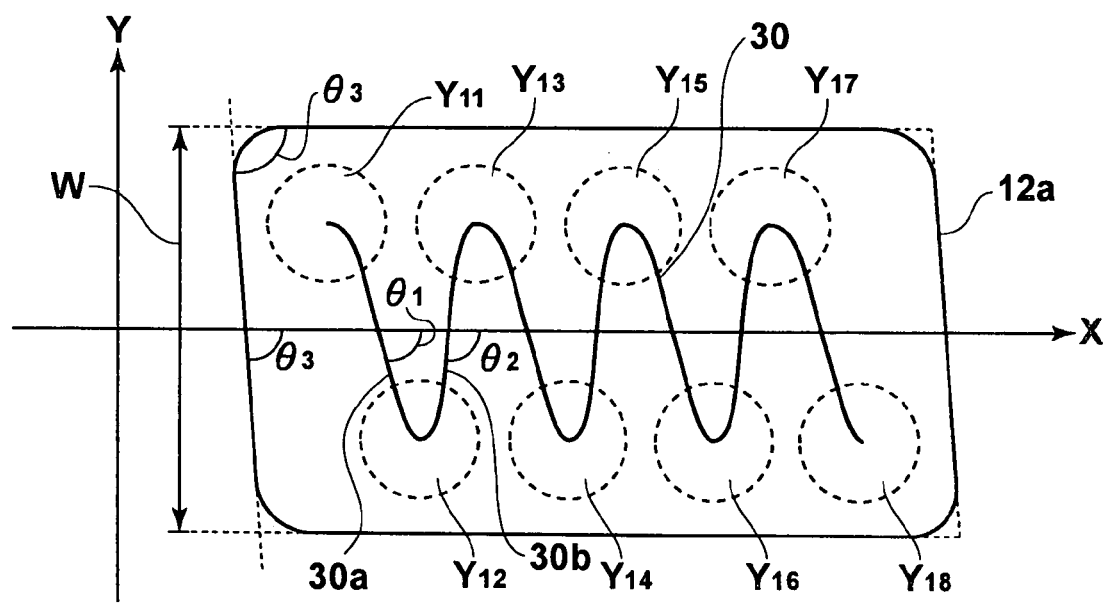
Figure 6A:
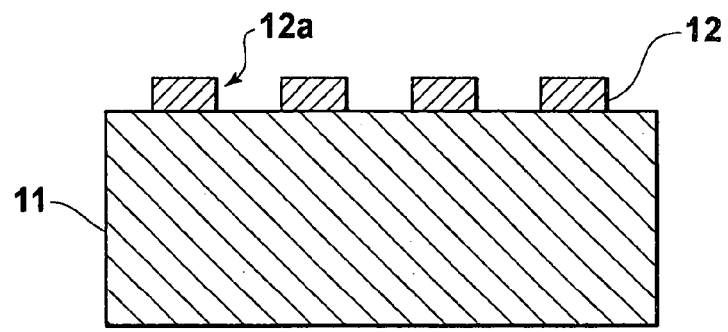
Figure 6B:
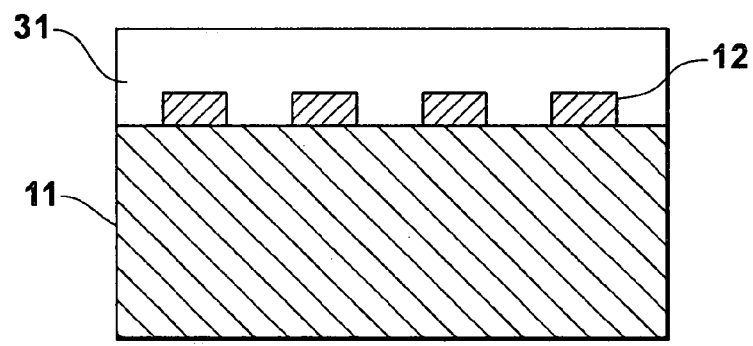
Figure 6C:
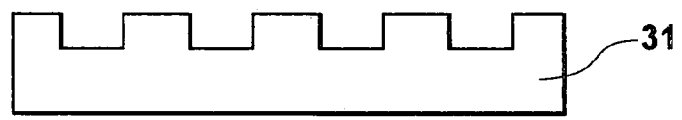
Figure 6D:
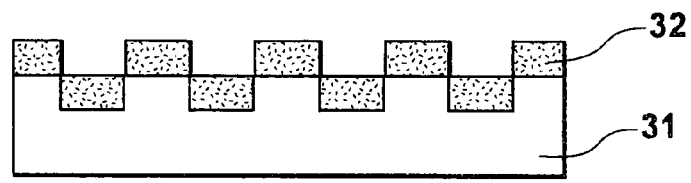
Figure 7A:
Figure 7B:
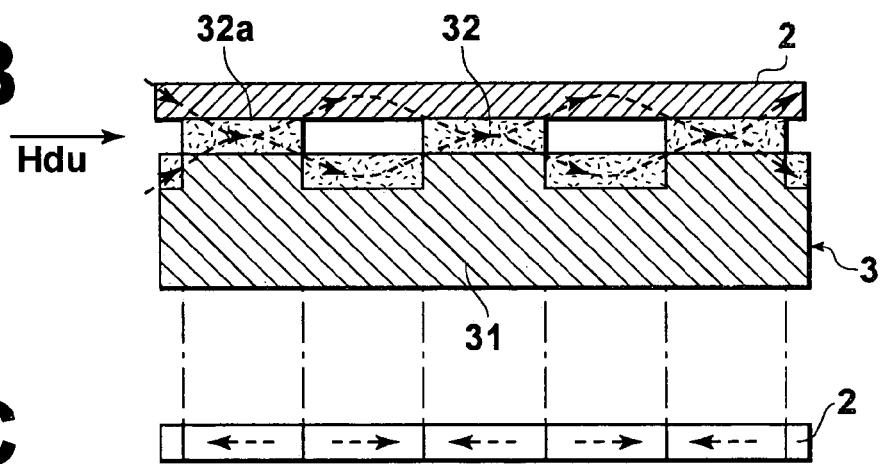
Figure 7C:
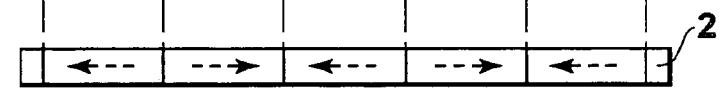
Figure 8A:
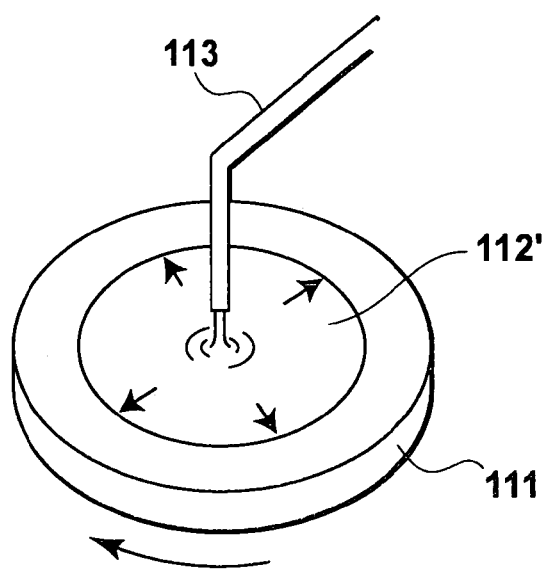
Figure 8B:
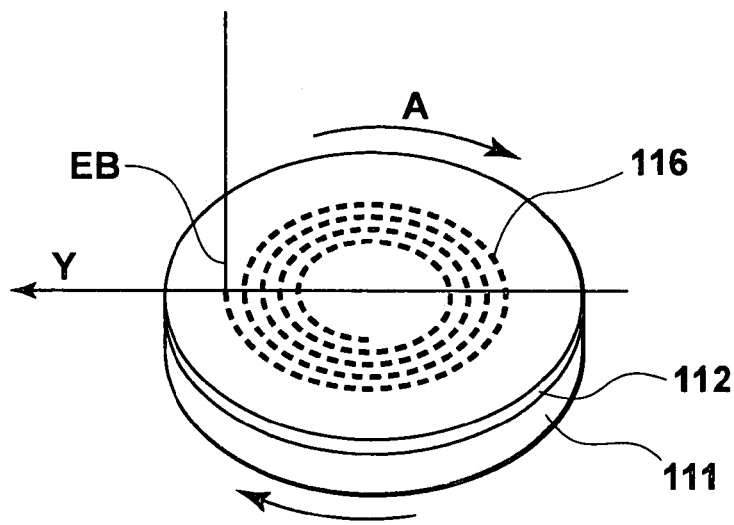
Figure 8C:
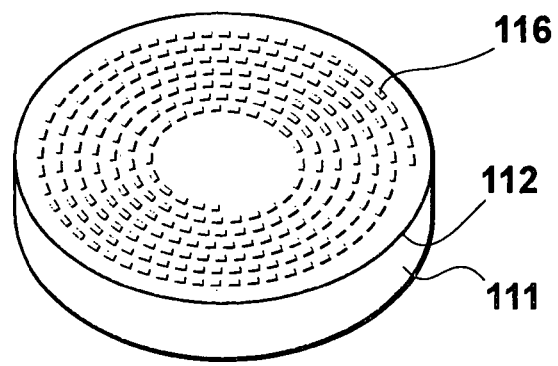
Figure 9:
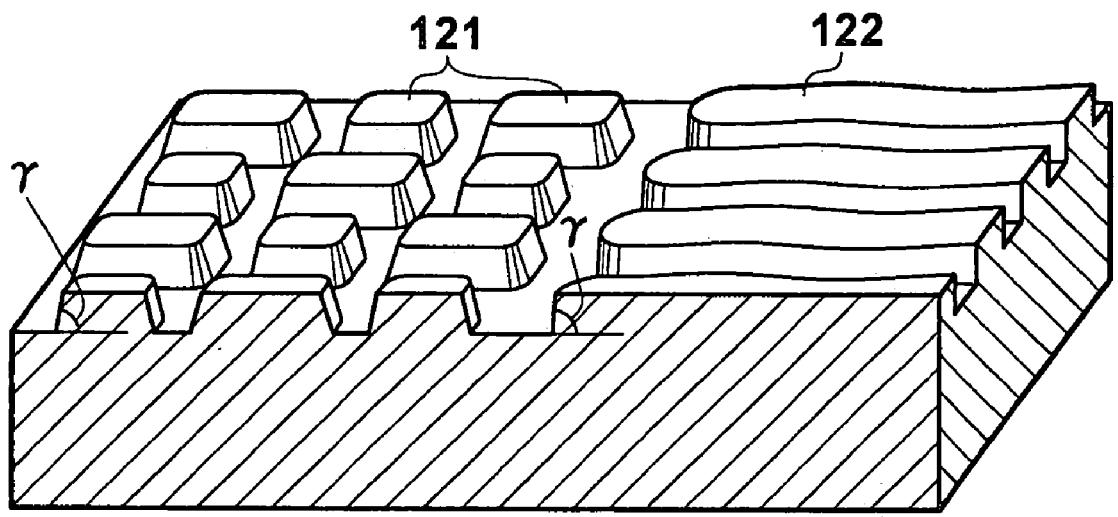
Figure 9:
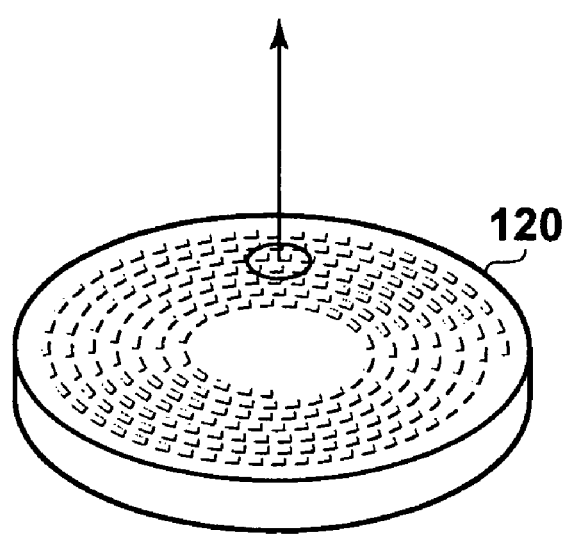
Figure 10:
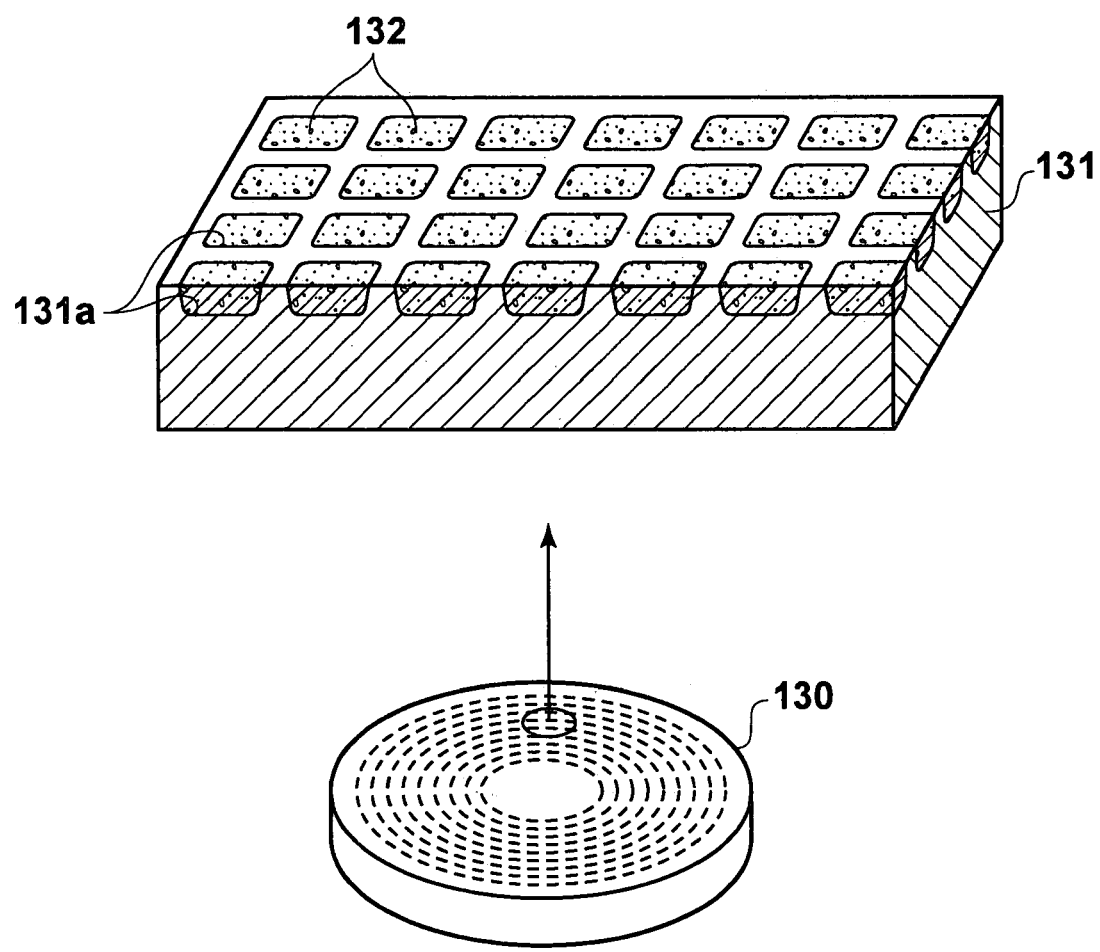
Figure 11:
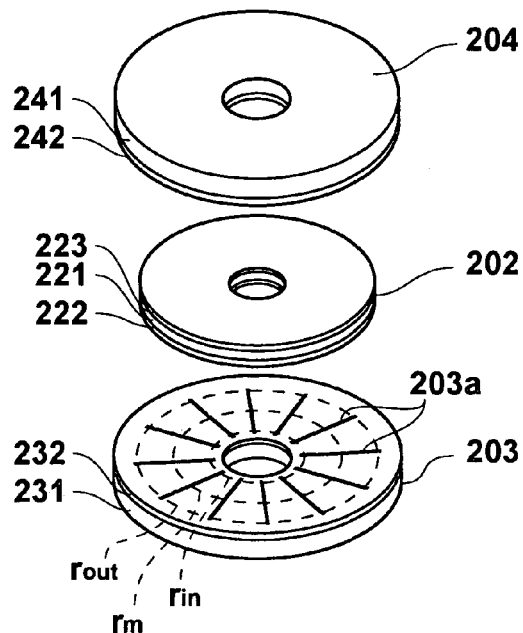
Figure 12A:
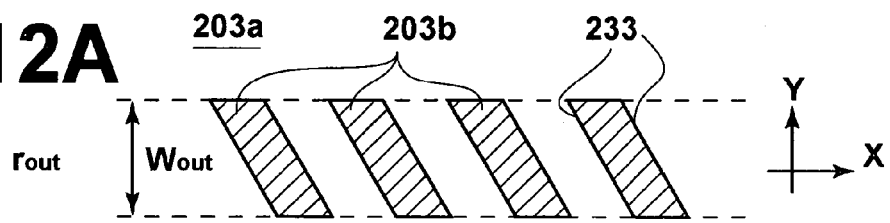
Figure 12B:
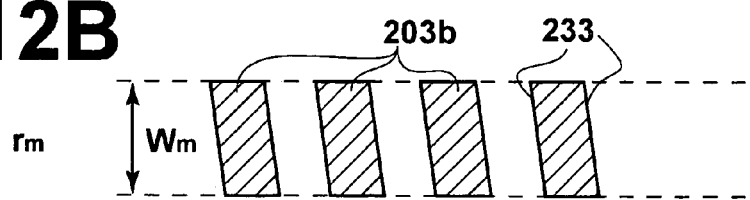
Figure 12C:
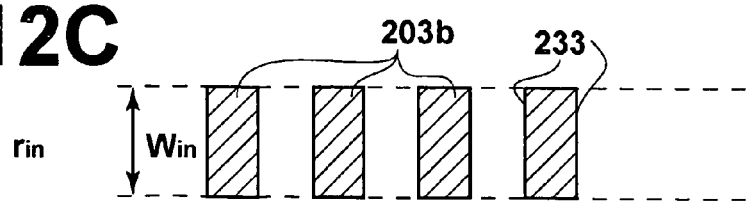
Figure 13:
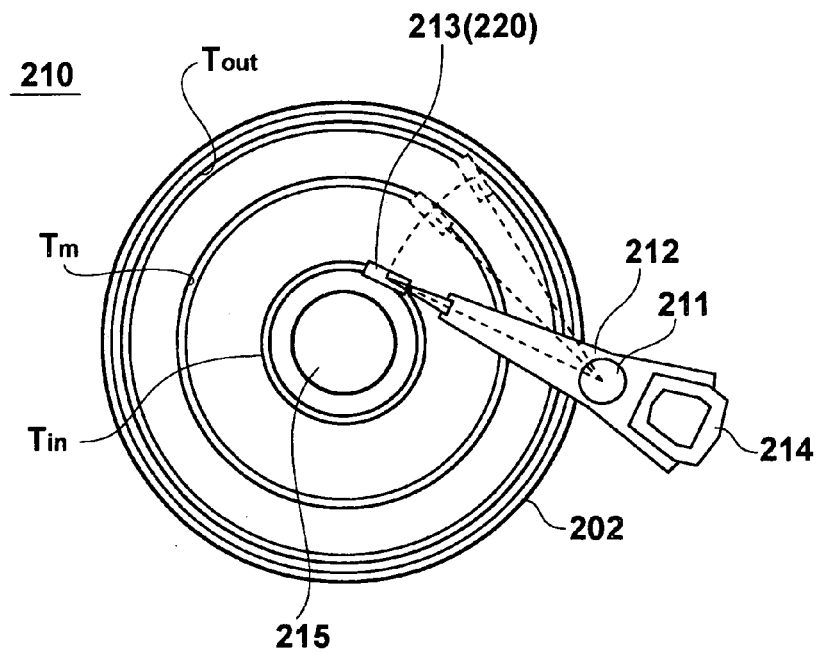
Figure 14A:
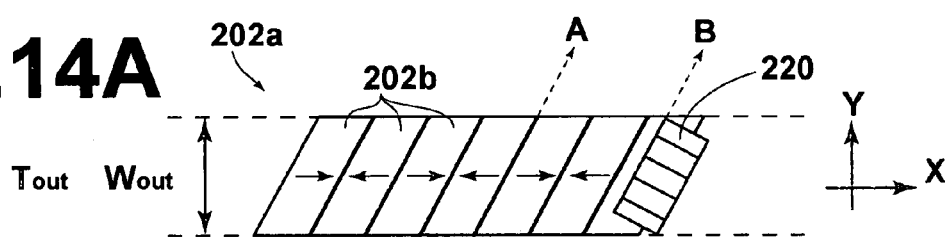
Figure 14B:
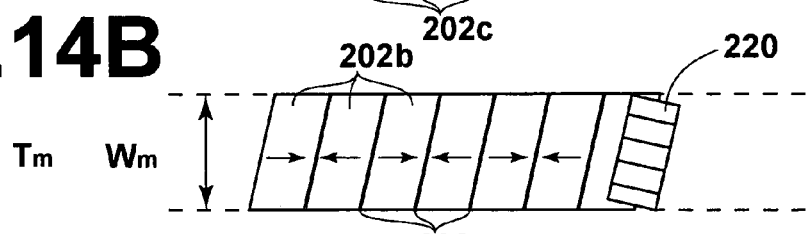
Figure 14C:
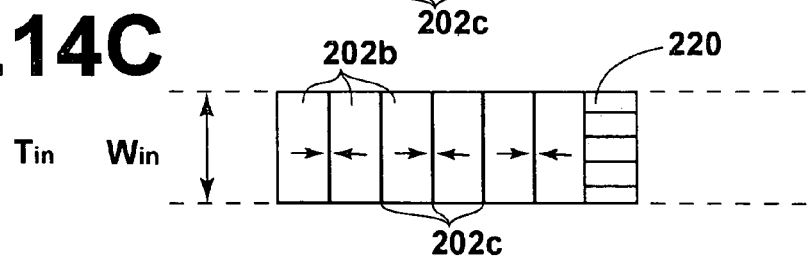
Figure 15A:
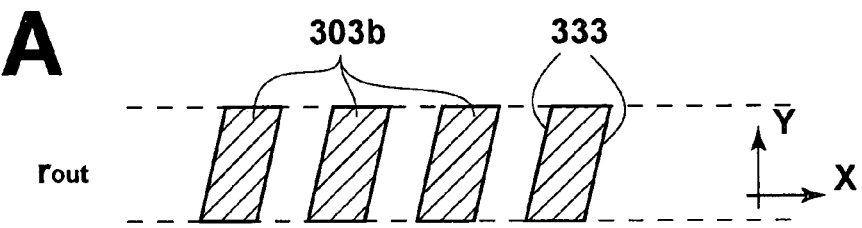
Figure 15B:
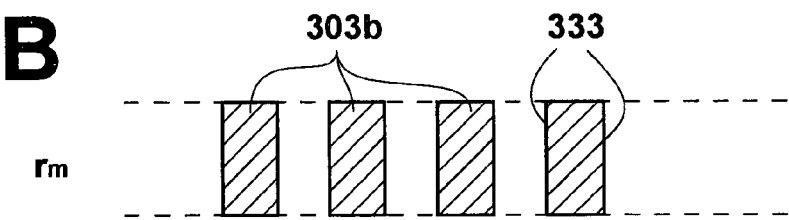
Figure 15C:
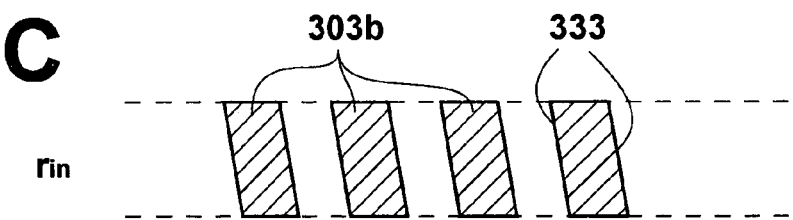

FIGS. 1A to 1C are views for illustrating formation of an irregularity pattern on a matrix for producing a master information carrier, FIG. 2 is an enlarged plan view showing a part of the pattern to be depicted in one recording track on the surface of the substrate in accordance with an embodiment of the present invention, FIG. 3A is a fragmentary side view showing an important part of the electron beam projecting unit, FIG. 3B is a plan view of the same, FIG. 4 is a schematic view illustrating a method of drawing the elements obliquely intersecting X-direction, FIG. 5 is a view illustrating another method of drawing the elements obliquely intersecting X-direction, FIGS. 6A to 6D are views for illustrating production of a master information carrier by the use of the matrix on which a desired pattern has been depicted in accordance with the method of the present invention, FIGS. 7A to 7C are views for illustrating the basic steps of magnetic transfer, FIGS. 8A to 8C are views for illustrating formation of an irregularity pattern on a matrix for producing an optical disc stamper in accordance with another embodiment of the present invention, FIG. 9 is a view showing the optical disc stamper and showing a part of the same in an enlarged scale, FIG. 10 is a view showing a patterned medium and showing a part of the same in an enlarged scale to be produced in accordance with still another embodiment of the present invention, FIG. 11 is an exploded perspective view showing master information carriers for magnetic transfer in accordance with a still another embodiment of the present invention, FIGS. 12A to 12C are views for illustrating patterns respectively formed along the circle rout of a maximum diameter, the circle rm of a medial diameter and the circle rin of a minimum diameter on the master information carrier shown in FIG. 11, FIG. 13 is a plan view showing a magnetic disc system, FIGS. 14A to 14C are views for illustrating magnetization patterns respectively formed along the outermost track Tout, the medial track Tm and the innermost track Tin of a magnetic disc medium in accordance with a still another embodiment of the present invention, and FIGS. 15A to 15C are views for illustrating patterns respectively formed along the circle rout of a maximum diameter, the circle rm of a medial diameter and the circle rin of a minimum diameter on the master information carrier of still another embodiment of the present invention.

DESCRIPTION OF THE PREFERRED EMBODIMENT

A method of producing a substrate of a master information carrier for magnetic transfer in accordance with an embodiment of the present invention will be described, hereinbelow.

The pattern to be depicted here is according to an irregularity pattern to be formed on the substrate of the master information carrier, and upper surfaces of the protruding portions of the irregularity pattern or openings of recessed patterns of the irregularity pattern are elements to be depicted.

As shown in FIG. 1A, for example, a resist solution 12', comprising a positive-type electron beam drawing resist 12 dissolved in an organic solvent, is applied to a disc-like substrate 11 of silicon, glass or quartz by spin coating from a nozzle 13 while rotating the disc-like substrate 11 in one direction and then the substrate 11 is baked.

Thereafter, as shown in FIG. 1B, an electron beam EB modulated according to information to be transferred such as a servo signal is caused to scan the disc-like substrate 11 carrying thereon the resist 12 while rotating the substrate in the direction of arrow A, thereby drawing (depicting) a desired pattern recording track by recording track. The direction A of rotation of the disc-like substrate 11 may be regarded as a direction X substantially perpendicular to a diametrical direction Y when microscopically viewed element by element. The direction X is sometimes referred to as "the circumferential direction" or "the direction of recording tracks", hereinbelow.

Then, as shown in FIG. 1C, the positive electron beam drawing resist 12 is developed and a disc-like substrate 11 on which a desired pattern 15 is drawn along concentric circles 16 is obtained.

The pattern 15 shown in FIG. 1C is a pattern according to a servo signal recorded in servo signal areas concentrically formed at predetermined intervals.

FIG. 2 is an enlarged plan view showing a part of the pattern 15 to be depicted in one recording track on the surface of the substrate 11. The pattern 15 includes elements 12a which extend obliquely intersecting the direction X of the recording tracks (circumferential direction). In FIG. 2, the hatched portions correspond to the elements 12a depicted with the electron beam (exposed to the electron beam). The elements 12a are substantially of a parallelogram having slant sides at angle θ to the direction X of the recording tracks. The areas exposed to the electron beam such as the elements 12a are removed with the resist 12 upon development and form recessed portions. This substrate 11 provided with an irregularity pattern of resist forms a matrix from which master information carriers are duplicated.

FIG. 3A is a fragmentary side view showing an important part of an electron beam projecting unit employed in this embodiment, and FIG. 3B is a plan view of the same. The electron beam projecting unit 40 comprises a pair of deflector means 21 and 22 which deflect an electron beam EB emitted from an electron gun 23 respectively in Y-direction (the direction of recording tracks) and X-direction (the circumferential direction), and the electron beam EB emitted from the electron gun 23 is projected onto the disc-like substrate 11 by way of deflector means 21 and 22, a lens (not shown) and the like with a beam diameter smaller than the minimum width of the elements. When the elements are depicted, the electron beam EB are finely oscillated at a predetermined amplitude in a predetermined direction intersecting X-direction of the substrate 11 by the deflector means 21 and 22.

Further, the electron beam projecting unit 40 comprises a rotary stage unit 45 including a circular stage 41 which supports the disc-like substrate 11 and a spindle motor 44 having a motor shaft coaxial with the central axis of the circular stage 41, a shaft 46 which extends through a part of the rotary stage unit 45 in a radial direction of the circular stage 41 (Y-direction) and a moving means which is for moving the rotary stage unit 45 along the shaft 46 and includes a threaded rod 47 extending in parallel to the shaft 46 in mesh with a part of the rotary stage unit 45 and a pulse motor 48 which rotates the threaded rod 47 in regular and reverse directions. A controller 50 controls drive of the pulse motor 48, modulation of the electron beam EB and deflector means 21 and 22.

A method of drawing the elements 12a obliquely intersecting X-direction will be described with reference to FIG. 4, hereinbelow. The elements 12a are drawn by periodically oscillating the electron beam EB in a predetermined direction at a predetermined amplitude by driving the Y-direction deflector means 21 and the X-direction deflector means 22 in synchronization with each other by periodic function signals while rotating the disc-like substrate 11 in the direction of arrow A.

That is, the electron beam EB is caused to scan the resist 12 from a point Y1 to a point Y2, from the point Y2 to a point Y3, from the point Y3 to a point Y4 . . . from a point Y7 to a point Y8 in sequence and one element 12a is thus depicted.

The element 12a is depicted by causing an electron beam whose beam diameter is smaller than the minimum width w of the element 12a to scan the resist layer so that the trajectory of the beam center of the electron beam on the resist layer draws a periodic waveform 20 (shown by the solid line in FIG. 4) traveling along axis X parallel to one pair of opposed sides of the element 12a. The waveform 20 is drawn from a starting point on the valley Y1 to an end point on the peak Y8. The beam diameter is defined by a full width half maximum in a beam intensity distribution, and an electron beam which is 30 nm in the full width half maximum is used. The periodic waveform 20 is drawn from a starting point which is on the valley Y1 by causing the electron beam EB to scan the resist 12 so that an angle θ3 between the slant sides of the element 12a and the axis X, an angle θ1 which is an angle between a first half period 20a of the waveform 20 starting from the starting point Y1 and the axis X and a corresponding angle to the angle θ3, and an angle θ2 which is an angle between a second half period 20b of the waveform 20 contiguous to the first half period 20a and the axis X and a corresponding angle to the angle θ3 satisfy the relation $$\theta 1 < \theta 3 < \theta 2.$$

Here the angle θ3 between the slant sides of the element 12a and the axis X is defined to be an angle which is a corresponding angle to an interior angle nearest to the, starting point Y1.

When the electron beam EB is caused to scan so that the trajectory of the beam center of the electron beam 20 draws the periodic waveform 20, areas where the electron beam EB overlaps are generated at the valleys and peaks of the waveform 20. When the electron beam EB overlaps, the amount of the electron beam EB to which the area is exposed is increased, and the area exposed to the electron beam EB becomes larger than the actual beam projecting area, which results in a problem that the area exposed to the electron beam EB and the actual beam projecting area does not conform to each other. However, so long as the angles θ1 and θ2 keep the relation identified above with the angle θ3, an element whose slant sides are at a desired angle θ3 to the X-direction can be depicted. The angles θ1 and θ2 should be suitably selected within the range according to the sensitivity of the resist, the diameter of the electron beam, and/or the like.

At this time, the Y-direction deflector means 21 and the X-direction deflector means 22 are controlled to control the direction in which the electron beam EB is oscillated so that the trajectory of the beam center of the electron beam draws a periodic waveform 20. The rotating speed of the disc-like substrate 11 is controlled so that the point on which the electron beam EB is projected is moved from point Y1 to point Y3 in one cycle of the oscillation of the electron beam EB, and the direction in which the electron beam EB is oscillated is determined taking into account the movement of the point on which the electron beam EB is projected in X-direction due to rotation of the disc-like substrate 11. After a pattern for one recording track is depicted, the rotary stage unit 45 is moved and a pattern for an adjacent recording track is depicted.

The circles shown by the dotted line in FIG. 4 indicate the diameter of the electron beam EB to be projected and the area over which the electron beam EB scans along the waveform 20 with the diameter is the beam projecting area. The electron beam EB overlaps at the peaks and the valleys of the waveform 20 and the area exposed to the electron beam EB becomes larger than the actual beam projecting area. As a result, an element 12a shown in FIG. 4 is depicted. When such an element 12a is depicted the corners of the parallelogram are not exposed to the electron beam EB and corners of the parallelogram element 12a are rounded though they should be pointed. Such rounded corners result in recording loss and in order to reduce this, it is effective to reduce the diameter of the electron beam EB and to increase the number of times of scanning, which may be suitably set taking into account the efficiency in depicting the pattern. It is believed that linearity of the slant sides intersecting the direction of the recording tracks is very important in the area of the recording tracks where the magnetic head runs but influence thereof is relatively small in edges of the recording tracks.

Another method of drawing the elements 12a obliquely intersecting X-direction will be described with reference to FIG. 5, hereinbelow. That is, the electron beam EB is caused to scan the resist 12 from a peak Y11 to a valley Y12, from the valley Y12 to a peak Y13, from the peak Y13 to a valley Y14 . . . from a peak Y17 to a valley Y18 in sequence and one element 12a is thus depicted.

When the waveform 20 is drawn from a starting point on a peak, the angle θ3 between the slant sides of the element 12a and the axis X is defined to be an angle which is a corresponding angle to an interior angle nearest to the starting point Y1. In order to depict an element 12a having slant sides inclined at the desired angle θ3 to the axis X, the electron beam EB to is caused to scan the resist 12 so that an angle θ3 between the slant sides of the element 12a and the axis X, an angle θ1 which is an angle between a first half period 30a of the waveform 30 starting from the starting point Y11 and the axis X and a corresponding angle to the angle θ3, and an angle θ2 which is an angle between a second half period 30b of the waveform 30 contiguous to the first half period 30a and the axis X and a corresponding angle to the angle θ3 satisfy the relation $$\theta 1 < \theta 3 < \theta 2.$$

As shown in FIG. 5, the area over which the electron beam EB scans along the waveform 30 is the beam projecting area. The electron beam EB overlaps at the peaks and the valleys of the waveform 30 and the area exposed to the electron beam EB becomes larger than the actual beam projecting area. As a result, an element 12a shown in FIG. 5 is depicted.

As can be understood from the description above, so long as the relation θ1<θ3<θ2 is satisfied, an element whose slant sides are at a desired angle θ3 to the X-direction can be accurately depicted.

Production of a master information carrier by the use of a matrix produced in the manner described above will be described with reference to FIGS. 6A to 6D, hereinbelow.

As shown in FIG. 6A, a desired pattern is drawn on a electron beam drawing resist 12 on the substrate 11 by projecting an electron beam EB in the manner described above and the resist 12 in the area 12a exposed to the electron beam EB is removed by developing the resist, whereby a matrix carrying thereon an irregularity pattern of the resist 12 is obtained.

Then a thin conductive layer is formed on the surface of the matrix and electroforming is applied to the thin conductive layer, whereby a metal substrate 31 having a positive irregularity pattern following the matrix is obtained as shown in FIG. 6B.

Thereafter, the metal substrate 31 in a predetermined thickness is peeled off the matrix as shown in FIG. 6C.

After the back side of the metal substrate 31 is polished, the metal substrate 31 may be used as a master information carrier, or the metal substrate 31 provided with a magnetic layer 32 on the surface of the irregularity pattern as shown in FIG. 6D may be used as a master information carrier.

Otherwise, the matrix may be plated to form a second matrix and the second matrix may be plated to form a metal substrate having a negative irregularity pattern. Further, a third matrix may be formed by plating the second matrix or pressing a resin syrup against the surface of the second matrix and curing the resin syrup, and a substrate having a positive irregularity pattern may be formed by plating the third matrix.

Whereas, after the resist 12 in the exposed area is removed by development, the disc-like substrate 11 selectively covered with the resist 12 left thereon may be etched and a matrix may be obtained by removing the resist 12 after etching. Thereafter, a substrate 31 can be obtained from the matrix in the same manner as described above.

In any case, the protruding portions or the recessed portions forming the irregularity pattern on the substrate 31 depend on the irregularity pattern of the resist on the matrix in their shape. As described above, substantially parallelogram elements are depicted by causing the electron beam EB to scan in the direction of the slant sides when the irregularity pattern on the matrix is formed, and accordingly a substrate 31 carrying thereon an irregularity pattern having elements whose slant sides are inclined at a desired angle can be obtained.

The substrate 31 may be formed of Ni or Ni alloys. The substrate 31 may be formed by various metal film forming techniques including electroless plating, electroforming, sputtering, and ion plating. The depth of the irregularity pattern (the height of the protruding portions) of the substrate 31 is preferably 80 nm to 800 nm, and more preferably 150 nm to 600 nm.

The magnetic layer 32 is formed by forming film of a magnetic material by, for instance, by vacuum film forming techniques such as sputtering or ion plating or plating. As the magnetic material, Co, Co alloys (e.g., CoNi, CoNiZr, or CoNbTaZr), Fe, Fe alloys (e.g., FeCo, FeCoNi, FeNiMo, FeAlSi, FeAl, or FeTaN), Ni or Ni alloys (e.g., NiFe) can be employed. FeCo and FeCoNi are especially preferred. The thickness of the magnetic layer 32 is preferably 50 nm to 500 nm, and more preferably 100 nm to 400 nm.

A master information carrier may be formed by forming a resin substrate by the use of the matrix produced in the manner described above and providing a magnetic layer on the surface of the resin substrate. As the material of the resin substrate, acrylic resin such as polycarbonate or polymethyl methacrylate, vinyl chloride resin such as polyvinyl chloride, or vinyl chloride copolymer, epoxy resin, amorphous polyolefin, polyester or the like may be used. Among those, polycarbonate is preferred in view of the humidity resistance, dimensional stability, cost and/or the like. Flash on the product should be removed by varnishing or polishing. Otherwise, ultraviolet curing resin or electron beam curing resin may be coated on the matrix, for instance, by spin coating or bar coating. The height of the protruding portions on the resin substrate is preferably 50 to 1000 nm and more preferably 100 to 500 nm. A magnetic layer is provided over the fine pattern on the surface of the resin substrate, thereby obtaining a master information carrier.

Alternatively, a master information carrier may be formed by forming a resin substrate by coating liquefied resin on a matrix carrying thereon an irregularity pattern representing information to be transferred and curing the liquefied resin, forming a magnetic layer on the irregularity pattern of the resin substrate, flattening the back side of the magnetic layer by polishing, forming a flat plate portion on the flattened back side of the magnetic layer by electroforming and peeling a master information carrier, comprising a flat substrate and a magnetic layer, carrying on the surface thereof an irregularity pattern, superposed on the flat substrate, off the resin substrate.

Magnetic transfer to an in-plane magnetic recording medium (a slave medium) will be described with reference to FIGS. 7A to 7C, hereinbelow. The magnetic transfer shown in FIGS. 7A to 7C is of an in-plane recording system.

In FIGS. 7A to 7C, only a magnetic recording area on one side of the slave medium is shown. An initial DC magnetic field Hin is first applied to the slave medium 2 in one direction parallel to the recording tracks thereof, thereby magnetizing the magnetic layer of the slave medium 2 in an initial DC magnetization as shown in FIG. 7A. Thereafter, the protruding portions 32a of the substrate 31 of the master information carrier 3 covered with the magnetic layer 32 is brought into close contact with the slave surface (magnetic recording area) of the slave medium 2. In this state, a transfer magnetic field Hdu is applied in the direction opposite to the initial DC magnetic field Hin as shown in FIG. 7B, thereby magnetically transferring the information on the master information carrier 3 to the slave medium 2. That is, the transfer magnetic field Hdu is absorbed in the magnetic layer 32 on the protruding portions 32a on the master information carrier 3 in close contact with the slave medium 2, and the initial magnetization of the part of the slave medium 2 in contact with the protruding portions 32a of the master information carrier 3 is not reversed but the initial magnetization of the other part of the slave medium 2 is reversed, whereby a magnetization pattern corresponding to a pattern of the protruding portions 32a and the recessed portions on the master information carrier 3 is recorded on (or transferred to) the slave surface (recording tracks) of the slave medium 2.

The information represented by the irregularity patterns on a pair of master information carriers 3 may be transferred to opposite sides of the slave medium 2 either simultaneously or in sequence.

The intensities of the initial magnetic field and the transfer magnetic field should be determined taking into account the coercive force of the magnetic layer of the slave medium 2, the specific permeabilities of the magnetic layers of the master information carrier 3 and the slave medium 2.

In the case of perpendicular recording, a master information carrier 3 substantially the same as that employed in in-plane recording is employed. In the case of perpendicular recording, the magnetic layer of the slave medium 2 is magnetized in advance in a perpendicular direction and a transfer magnetic field is applied to the slave medium 2 and the master information carrier 3 in close contact with each other in the direction opposite to the initial DC magnetic field, whereby the perpendicular magnetization of the part of the slave medium 2 in contact with the magnetic layer 32 of the protruding portions 32a of the master information carrier 3 is reversed, and the magnetic layer of the slave medium 2 is magnetized in a pattern corresponding to the irregularity pattern on the master information carrier 3.

A magnetic recording disc such as a hard disc or a high-density flexible disc provided with a magnetic layer on one side or each side thereof is generally employed as the slave medium 2. The magnetic recording area thereof is generally of a coated magnetic layer or a metal film type magnetic layer. In the case of a slave medium having a magnetic layer of metal film, the material of the magnetic layer may be Co, Co alloy (e.g., CoPtCr, CoCr, CoPtCrTa, CoPtCrNbTa, CoCrB, CoNi or the like), Fe or Fe alloy (e.g., FeCo, FePt, FeCoNi). These materials are preferred in view of obtaining clearer magnetic transfer since the magnetic layer of these materials is higher in magnetic flux density. It is further preferred that the magnetic layer of the slave medium 2 be provided with a non-magnetic primer layer on the substrate side thereof in order to give the magnetic layer a necessary magnetic anisotropy. The primer layer should match to the magnetic layer in crystallographic structure and lattice constant. For this purpose, Cr, CrTi, CoCr, CrTa, CrMo, NiAl, Ru or the like may be employed as the non-magnetic primer layer.

The magnetic field application means for applying the initial magnetic field and the transfer magnetic field comprises, for instance, a pair of ring type electromagnets each disposed on one side of the slave medium 2 and the master information carrier 3 in a close contact with each other. Each of the electromagnets comprises a core having a gap extending in a radial direction of the slave medium 2 and a winding wound around the core. In the case of the in-plane recording, the ring type electromagnets on opposite sides of the slave medium 2 and the master information carrier 3 in a close contact with each other applies magnetic fields in the same direction in parallel to the tracks. The magnetic field application means applies a magnetic field to the slave medium 2 and the master information carrier 3 while rotating the slave medium 2 and the master information carrier 3 in a close contact with each other. Instead of rotating the slave medium 2 and the master information carrier 3, the magnetic field application means may be rotated. A ring type electromagnet may be disposed only on one side of the slave medium 2 and the master information carrier 3 or on each side of the same. A permanent magnet may be employed in place of the electromagnets.

In the case of the perpendicular recording, a pair of electromagnets or a permanent magnets different in polarity are disposed on opposite sides of the holder so that a magnetic field is generated in perpendicular to the tracks. When the magnetic field application means is of a type which applies a magnetic field only apart of the slave medium 2 and the master information carrier 3, the assembly of the slave medium 2 and the master information carrier 3 and the magnetic field are moved with respect to each other so that a magnetic field is applied to the slave medium 2 and the master information carrier 3 over the entire area thereof.

A method of producing an optical disc stamper involving a method of depicting elements in accordance with another embodiment of the present invention will be described, hereinbelow.

FIGS. 8A to 8C are views for illustrating formation of an irregularity pattern on a matrix for producing an optical disc stamper, and FIG. 9 is a view showing the optical disc stamper and showing a part of the same in an enlarged scale.

As shown in FIG. 9, the optical disc stamper 120 is provided on its surface with an irregularity pattern formed of helically arranged pit forming portions 121 and groove forming portions 122, which are protruding. The shapes of the upper surfaces of the pit forming portions 121 and the groove forming portions 122 form a desired pattern to be depicted in accordance with the method of the present invention.

As shown in FIG. 8A, for example, a resist solution 112', comprising electron beam drawing resist 112 dissolved in organic solvent, is applied to a disc-like substrate 111 of silicon by spin coating from a nozzle 113 while rotating the disc-like substrate 111 in one direction and then the substrate 111 is baked. In place of the disc-like substrate 111 of silicon, a disc-like substrate of glass provided with conductive film may be employed.

Thereafter, as shown in FIG. 8B, an electron beam EB modulated according to data representing lengths of pits (or grooves) is caused to scan the disc-like substrate 111 carrying thereon the resist 112 while rotating the substrate 111 in the direction of arrow A, thereby depicting a desired pattern. By substantially continuously moving the stage 41 in the direction of arrow Y while rotating the same in the direction of arrow A, a helical pattern (a pattern of the helically arranged pit forming portions and groove forming portions and the like) 116 is depicted. The beam diameter of the electron beam EB on the resist 112 is smaller than the minimum width of the element, and a pattern 116 corresponding to the upper surfaces of the pit forming portions, grooves and the like is depicted in the same manner as described above in conjunction with production of the substrate for a master information carrier for magnetic transfer. Since the groove forming portions shown in FIG. 9 are for forming wobble grooves, for instance, the amplitudes of the electron beam EB is varied to provide desired wobble.

Then, as shown in FIG. 8C, the electron beam drawing resist 112 is developed and a silicon-disc-like substrate 111 on which a helical desired pattern 116 is drawn is obtained. The substrate 111 makes a matrix on the basis of which a plurality of optical disc stampers are duplicated.

By the use of an optical disc stamper thus produced, a plurality of optical discs are duplicated.

The trajectory of the electron beam during depiction of the elements depends upon the periodic functions employed, and since the amount of exposure of the resist at ends of the elements depends upon the trajectory of the electron beam during depiction of the elements, the rising angle of the protruding portions (indicated at γ in FIG. 9) depends upon the periodic functions employed. It is believed that the rising angle γ affects the reproduction properties. In the conventional technology, where the elements are depicted with a laser beam, the rising angle γ of the protruding portions cannot be changed since the shape of the protruding portions is governed by the diameter of the laser beam. Whereas, in accordance with this embodiment where an electron beam smaller than the minimum width of the pit forming portions or the groove forming portions in its beam diameter is used, the rising angle γ of the protruding portions can be a desired angle. Accordingly, the periodic functions are selected so that the reproduction properties of the optical disc is optimal.

A method of producing a patterned medium involving a method of depicting elements in accordance with still another embodiment of the present invention will be described, hereinbelow.

As shown in FIG. 10, a patterned medium 130 comprises a disc-like substrate 131 on the surface of which a plurality of rectangular recessed portions 131a are regularly arranged along concentric tracks and magnetic material 132 embedded in each of the recessed portions 131a. The pattern of the recessed portions 131a is the pattern to be depicted and the shape of the opening of each recessed portion 131a is the element forming the pattern. The pattern of the recessed portions 131a is depicted by the method of the present invention, and the substrate 131 provided with recessed portions is prepared and, then magnetic material is embedded in each of the recessed portions 131a.

More particularly, resist layer is formed on the substrate 131 and the pattern of the recessed portions 131a is depicted on the resist layer in the same manner as described above in conjunction with production of the substrate for a master information carrier for magnetic transfer. For example, since the angle θ3 between the sides of the element 131a and the axis X is 90° in this particular embodiment, the element 131a can be depicted by causing the electron beam EB to scan the resist 112 so that the angle θ3, the angle θ1, and the angle θ2 satisfy the relation

θ1<θ3<θ2.

Thereafter, the resist layer is developed to form an irregularity pattern of resist on the surface of the substrate 131, and the surface of the substrate 131 is etched and magnetic material is deposited on the etched part of the surface of the substrate 131 with the resist left on the surface of the substrate 131 used as a mask. The resist left on the surface of the substrate 131 is subsequently lifted off to leave a patterned medium shown in FIG. 10 as disclosed, for instance, in Japanese Unexamined Patent Publication No. 2001-110050. The substrate having an irregularity pattern on the surface thereof may be formed by first forming a matrix having an irregularity pattern on the surface thereof and subsequently carrying out electroforming on the matrix in the same manner as described above in conjunction with production of the substrate for a master information carrier for magnetic transfer. The patterned medium need not be in the form where magnetic material 132 is embedded but may be in the form where protruding portions of magnetic material are arranged in a predetermined pattern on the surface of a flat substrate.

Though production of a master information carrier, an optical disc stamper and a patterned medium has been described above, they may be produced in other various ways so long as a desired pattern is depicted in accordance with the method of the present invention on the substrate for producing them.

Still another embodiment of the present invention will be described with reference to FIGS. 11 to 14, hereinbelow.

FIG. 11 is an exploded perspective view showing master information carriers for magnetic transfer 203 and 204 in accordance with a still another embodiment of the present invention, and a slave medium 202 to which information is transferred from each of the master information carriers for magnetic transfer 203 and 204. The slave medium 202 is a magnetic disc medium such as a hard disc or a high-density flexible disc and comprises a non-magnetic substrate 221 and a magnetic recording layers 222 and 223 formed on opposite sides of the substrate 221.

The master information carriers 203 and 204 are disc-like rigid bodies comprising disc-like substrates 231 and 241 and magnetic layers 232 and 242 formed on the substrates 231 and 241. The lower master information carrier 203 carries a pattern of magnetic materials 203b formed on the protruding portions of the irregularity pattern representing information to be transferred to the lower magnetic layer 222 of the slave medium 202 and the upper master information carrier 204 carries a pattern of magnetic materials 203b formed on the protruding portions of the irregularity pattern representing information to be transferred to the upper magnetic layer 223 of the slave medium 202. In this particular embodiment, the information carried by each of the master information carriers 203 and 204 is a servo signal for positioning the slave medium 202 with respect to a magnetic head and a pattern representing the servo signal is formed in a plurality of radial servo regions 203a.

In the case where the substrate 231 and 241 are of ferromagnetic material such as Ni, the magnetic transfer can be carried out even if the irregularity pattern is not provided with the magnetic layer 232 and 242. However, by providing the magnetic layer, better magnetic transfer can be carried out. In the case where the substrate is of non-magnetic material, it is necessary to provide the magnetic layer. When a protective film such as of DLC (diamond-like carbon) is provided on the outermost layer, the durability of the master information carrier is improved and the master information carrier comes to withstand a more number of times of magnetic transfer. Si film may be formed under the DLC protective film by, for instance, sputtering.

The master information carrier 203 will be described in more detail as a representative of the master information carriers 203 and 204, hereinbelow. FIGS. 12A to 12C are views for illustrating a part of the elements 203b respectively formed along the circle rout of a maximum diameter, the circle rm of a medial diameter and the circle rin of a minimum diameter of the servo region 203a. The shape of the upper surface of each of the magnetic element 203b (hatched portions) is substantially a parallelogram with its one pair of opposed sides extending in the circumferential direction X and its the other pair of opposed sides 233 extending to intersect the circumferential direction X. The inclination of said the other pair of opposed sides 233 of the part of the magnetic element 203b to the radial direction Y is larger along the outer circle and the radial width of the part of the magnetic element 203b is larger along the outer circle (Win<Wm<Wout). The shape of the part of the element 203b (inclination of the sides 233 of the part of the magnetic element 203b) and the radial width thereof are set taking into account the azimuth angle of the reproduction head of the magnetic disc system in which the magnetic disc medium to which information is transferred from the master information carrier of this embodiment is employed. Said the other opposed sides 33 extend in the direction of width of the head gap of the reproduction head in a position on the magnetic disc medium corresponding to the magnetic element 203b.

The depth of the irregularity pattern (the height of the protruding portions) of the substrate 231 is preferably 80 nm to 800 nm, and more preferably 150 nm to 600 nm. In the case where the irregularity pattern represents a servo signal, each element is longer in the radial direction. For example, each element is 0.05 to 20 μm in the radial direction and 0.05 to 5 μm in the circumferential direction. It is preferred that each of the elements be longer in the radial direction within this range.

FIG. 13 is a fragmentary plan view showing an important part of a magnetic disc system employing a magnetic disc medium in accordance with a still another embodiment of the present invention to which information is transferred from the master information carrier of the preceding embodiment by magnetic transfer.

The magnetic disc system 210 shown in FIG. 13 comprises a magnetic disc medium 202 carrying thereon a magnetization pattern formed by the magnetic transfer, a rotary arm 212 rotatable about a pivot 211, a magnetic head 213 fixed to the free end of the rotary arm 212, an actuator 214 which rotates the rotary arm 212 and a spindle motor 215 which rotates the magnetic disc medium 202. Though not shown, the magnetic disc system 210 further comprises a controller which controls positioning of the magnetic head 213, rotation of the magnetic disc medium 202, and the like, a data processing circuit, an interface between the magnetic disc system 210 and a computer, a cover and the like.

One or more magnetic disc medium (media) is rotated by the spindle motor 215.

The magnetic head 213 is for recording and reproducing data and may be either a type where recording and reproduction are effected by a single head element or a type where recording and reproduction are effected by separate head elements. The head element of the former type magnetic head and an interactive head such as a ferrite head or a film head, and the reproduction head element of the latter type magnetic head may be, for instance, an MR head or a GMR head.

The actuator 214 rotates the rotary arm 212 to arcuately move the magnetic head 213 on the free end of the rotary arm 212 as shown by the dotted line in FIG. 13.

FIGS. 14A to 14C schematically show magnetization patterns 202a formed on an outer track Tout, a medial track Tm and an inner track Tin, respectively. In FIGS. 14A to 14C, the reproduction head element 220 of the magnetic head 213 (will be referred to simply as "the reproduction head 220", hereinbelow) is shown to show the inclination of the reproduction head 20 in each track. The magnetization patterns 202a of the magnetic disc medium 202 are formed to follow the pattern of the master information carrier 203 shown in FIGS. 12A to 12C, and the magnetic domains 202b and the magnetic walls 202c correspond in shape to the elements 203b.

As shown in FIGS. 14A to 14C, the inclination to the radial direction Y (perpendicular to the direction X of tracks) of the direction A in which the magnetic walls (magnetization transition zones) 202c between the magnetic domains 202b forming the magnetization pattern 202a extend to intersect the direction X of tracks differs from track to track. The direction A is substantially parallel to the direction B of the width of the head gap of the reproduction head 220 in each track. Further the widths Wout, Wm and Win of the tracks Tout, Tm and Tin have been set according to the inclination of the reproduction head 220 and, in this particular embodiment, the track width is increased outward.

In the magnetic disc medium 202, since a magnetization pattern according to the inclination to the track of the reproduction head 220 of the magnetic disc system in which the relevant disc medium 202 is employed is formed, the reproduction head 220 can constantly detect a magnetization transition zone 202c substantially parallel to the width of the head gap (the direction of width of the reproduction track), whereby the azimuth loss can be suppressed and a good reproduction signal can be obtained.

Though, the magnetization pattern shown in FIGS. 14A to 14C is suitable for the magnetic disc system 210 shown FIG. 13, the magnetization pattern of the magnetic disc medium and the pattern of magnetic material of the master information carrier for producing the magnetization pattern of the magnetic disc medium need not be limited to those shown in FIGS. 12A to 12C and FIGS. 14A to 14C but may be changed according to the structure of the magnetic disc system in which the magnetic disc medium is loaded, e.g., the length of the rotary arm, the position of the pivot, the position of the magnetic head fixed to the rotary arm and/or the like.

For example, in the case of a magnetic disc medium to be employed in a magnetic disc system where the reproduction head extends substantially in parallel to the track when the reproduction head is applied to the medial track Tm, the magnetization pattern is such that the magnetization transition zone extends in parallel to the width of the track in the medial track Tm and the magnetization transition zones in the outer and inner tracks Tout and Tin are inclined in opposite directions.

The master information carrier for forming such a magnetization pattern on a magnetic disc medium has a pattern of elements, for instance, shown in FIGS. 15A to 15C. As shown in FIGS. 15A to 15C, each element 303b of the master information carrier of this embodiment has a pair of sides 333b extending in parallel to the radial direction Y in the part along the medial diameter circle rm, and has a pair of sides 333b inclined in opposite directions to the radial direction Y in the parts along the maximum diameter circle rout and the minimum diameter circle rmin.

Though, in the embodiments described above, the information to be transferred from the master information carrier to the magnetic disc medium is a servo signal, the information need not be limited to a servo signal.

Further, the irregularity pattern may be formed of helically arranged elements.

What is claimed is:

1. A method of depicting a desired pattern of elements, including an element having a slant side intersecting a recording track, on a resist layer formed on a disc-like substrate, by selectively exposing the resist layer to an electron beam, wherein the improvement comprises that said element having a slant side intersecting a recording track is depicted by causing an electron beam whose beam diameter is smaller than the minimum width of the element to scan the resist layer so that the trajectory of the beam center of the electron beam on the resist layer draws a periodic waveform traveling along an axis parallel to the recording track, said periodic waveform is drawn from a starting point which is on a valley or a peak of the waveform, and an angle $\theta 3$ between the slant side of the element and said axis, an angle $\theta 1$ which is an angle between a first half period of the trajectory of the electron beam starting from the starting point and said axis and a corresponding angle to the angle $\theta 3$, and an angle $\theta 2$ which is an angle between a second half period of the trajectory of the electron beam contiguous to the first half period and said axis and a corresponding angle to the angle $\theta 3$ satisfy the relation $$\theta 1 < \theta 3 < \theta 2.$$

2. A method as defined in claim 1 in which depiction of said element is carried out by oscillating back and forth the electron beam in directions intersecting the circumferential direction of the disc-like substrate while rotating the substrate in one direction.

3. A method as defined in claim 1 in which the disc-like substrate is a substrate for producing a master information carrier for magnetic transfer.

4. A method as defined in claim 3 in which the master information carrier carries on its substrate an irregularity pattern formed of a pattern of protruding portions and the recessed portions representing information to be transferred to a slave medium.

5. A method as defined in claim 4 in which the information to be transferred to the slave medium includes a servo signal.

6. A method as defined in claim 3 in which a magnetic layer is formed on the upper surface of the protruding portions.

7. A method as defined in claim 3 in which a magnetic layer is formed on the upper surface of the protruding portions and the bottom of the recessed portions.

8. A method as defined in claim 1 in which the disc-like substrate is a substrate for producing an optical disc stamper.

9. A method as defined in claim 1 in which the disc-like substrate is a substrate for producing a patterned medium for high-density magnetic recording.

10. A disc-like substrate for high-density recording produced through the step of depicting a desired pattern of elements, including an element having a slant side intersecting a recording track, on a resist layer formed on a disc-like substrate, by selectively exposing the resist layer to an electron beam, wherein the improvement comprises that said element having a slant side intersecting a recording track is depicted by causing an electron beam whose beam diameter is smaller than the minimum width of the element to scan the resist layer so that the trajectory of the beam center of the electron beam on the resist layer draws a periodic waveform traveling along an axis parallel to the recording track, said periodic waveform is drawn from a starting point which is on a valley or a peak of the waveform, and an angle θ3 between the slant side of the element and said axis, an angle θ1 which is an angle between a first half period of the trajectory of the electron beam starting from the starting point and said axis and a corresponding angle to the angle θ3, and an angle θ2 which is an angle between a second half period of the trajectory of the electron beam contiguous to the first half period and said axis and a corresponding angle to the angle θ3 satisfy the relation

θ1<θ3<θ2.

11. A disc-like substrate for high-density recording as defined in claim 10 in which depiction of said element is carried out by oscillating back and forth the electron beam in directions intersecting the circumferential direction of the disc-like substrate while rotating the substrate in one direction.

12. A disc-like substrate for high-density recording as defined in claim 10 in which the disc-like substrate is a substrate for producing a master information carrier for magnetic transfer.

13. A disc-like substrate for high-density recording as defined in claim 12 in which the master information carrier carries on its substrate an irregularity pattern formed of a pattern of protruding portions and the recessed portions representing information to be transferred to a slave medium.

14. A disc-like substrate for high-density recording as defined in claim 13 in which the information to be transferred to the slave medium includes a servo signal.

15. A disc-like substrate for high-density recording as defined in claim 12 in which a magnetic layer is formed on the upper surface of the protruding portions.

16. A disc-like substrate for high-density recording as defined in claim 12 in which a magnetic layer is formed on the upper surface of the protruding portions and the bottom of the recessed portions.

17. A disc-like substrate for high-density recording as defined in claim 10 in which the disc-like substrate is a substrate for producing an optical disc stamper.

18. A disc-like substrate for high-density recording as defined in claim 10 in which the disc-like substrate is a substrate for producing a patterned medium for high-density magnetic recording.

19. A master information carrier which is for transferring information to a magnetic disc medium to be used in a magnetic disc system having a reproduction head fixed to a rotary arm and is provided on its surface with a pattern of concentrically or helically arranged magnetic elements representing the information to be transferred, wherein each magnetic element forming the pattern has an upper surface which is a parallelogram in shape having two pairs of opposed parallel sides, one pair of opposed parallel sides thereof extending along a circumferential direction of the concentric circles or the helicoids along which the magnetic elements are arranged, and the other pair of opposed parallel sides extending in a direction intersecting the circumferential direction, and said the other pair of opposed parallel sides extend in the direction of width of the head gap of the reproduction head in a position on the magnetic disc medium corresponding to the magnetic element.

20. A master information carrier as defined in claim 19 in which said information is a servo signal.

21. A magnetic disc medium which is used in a magnetic disc system having a reproduction head fixed to a rotary arm and is provided with concentric recording tracks or a helical recording track, wherein a magnetization pattern comprising magnetic domains arranged along the recording track is formed on the magnetic disc medium transferred by magnetic transfer from the master information carrier as defined in claim 19, and the magnetization transition zone between the magnetic domains arranged along the recording track extends in the direction of width of the head gap of the reproduction head in the track position.

22. A magnetic disc medium as defined in claim 21 in which the magnetization pattern represents a servo signal.

* * * * *